United States Patent [19]

Johnson

[11] 4,175,605
[45] Nov. 27, 1979

[54] PROPELLER NUT

[75] Inventor: Gary E. Johnson, Alameda, Calif.

[73] Assignee: Johnson Propeller Company, Oakland, Calif.

[21] Appl. No.: 863,731

[22] Filed: Dec. 23, 1977

[51] Int. Cl.² .................. F16B 39/284; B63H 5/06
[52] U.S. Cl. .................................. 151/7; 85/35; 151/21 B; 416/245 A
[58] Field of Search .............. 151/7, 14.5, 21 B; 85/DIG. 2, 35; 416/245 R, 245 A

[56] References Cited

U.S. PATENT DOCUMENTS

| | | | |
|---|---|---|---|
| 1,447,056 | 2/1923 | Bates | 151/22 |
| 1,920,880 | 8/1933 | Parker | 416/245 X |
| 2,255,384 | 9/1941 | Hood | 151/21 B X |
| 2,270,575 | 1/1942 | Bahr | 416/245 X |
| 2,337,030 | 12/1943 | Cole | 151/21 B |
| 2,353,431 | 7/1944 | Arden | 416/245 |
| 3,030,997 | 4/1962 | Collins | 151/7 |
| 3,388,627 | 6/1968 | Tinnerman | 151/7 X |
| 3,468,212 | 9/1969 | Tinnerman | 151/7 X |
| 3,819,294 | 6/1974 | Honnold et al. | 416/245 X |
| 3,901,627 | 8/1975 | Sullivan | 416/245 |

FOREIGN PATENT DOCUMENTS

| | | | |
|---|---|---|---|
| 539214 | 4/1957 | Canada | 151/7 |
| 876636 | 9/1961 | United Kingdom | 151/7 |

*Primary Examiner*—Thomas J. Holko
*Attorney, Agent, or Firm*—Owen, Wickersham & Erickson

[57] ABSTRACT

A self-locking propeller nut, suitable for marine drive trains which involve a great deal of vibration, is disclosed. The nut, which has a nose-cone shaped exterior similar to conventional propeller nuts, is molded integrally of semi-rigid plastic. At its center is a threaded bore wherein the thread diameter tapers narrower into the nut and wherein the thread spacing is slightly different from that of the propeller shaft end. The threaded bore lies in an inner cylindrical body which is recessed and connected to the housing in such a way as to further promote retention of the nut on the shaft.

2 Claims, 5 Drawing Figures

U.S. Patent  Nov. 27, 1979  4,175,605
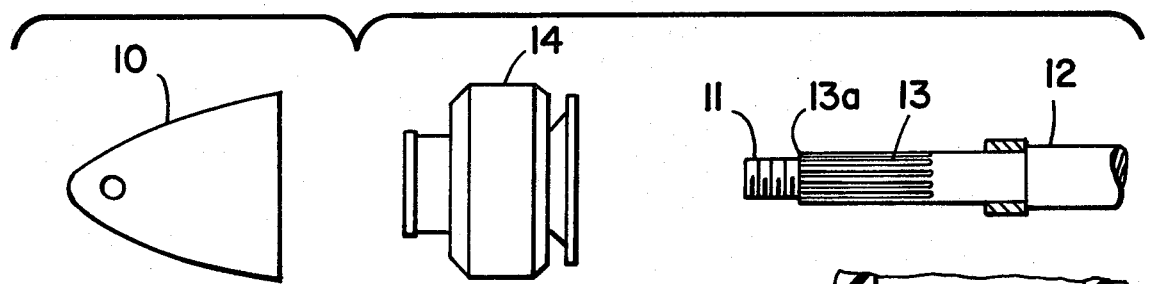
FIG_1
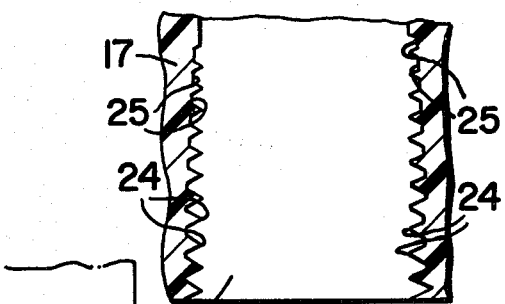
FIG_5
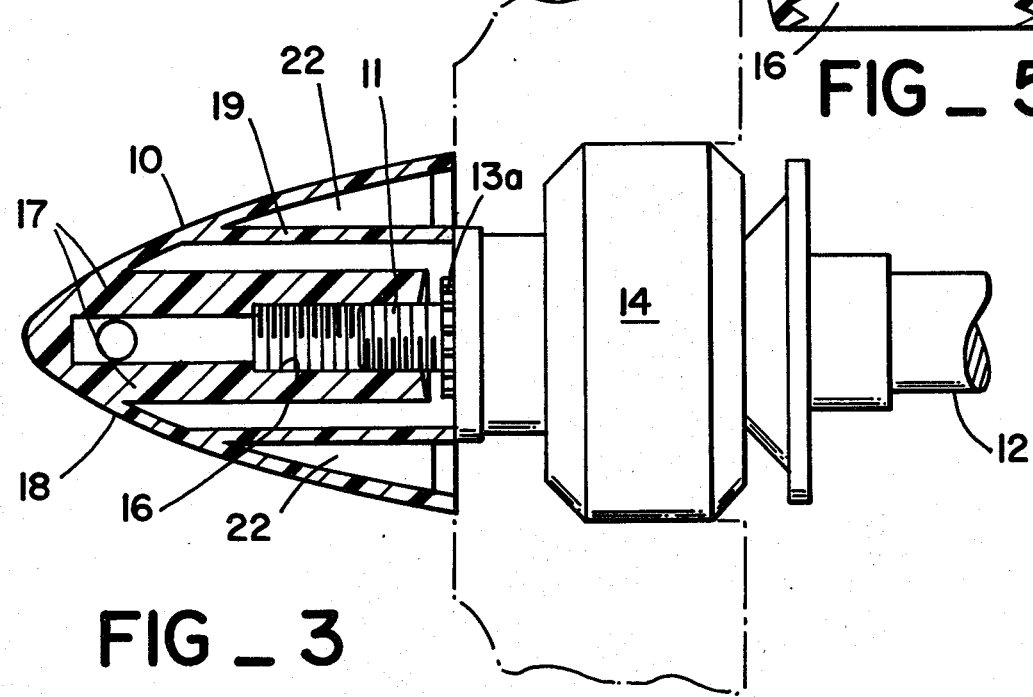
FIG_3
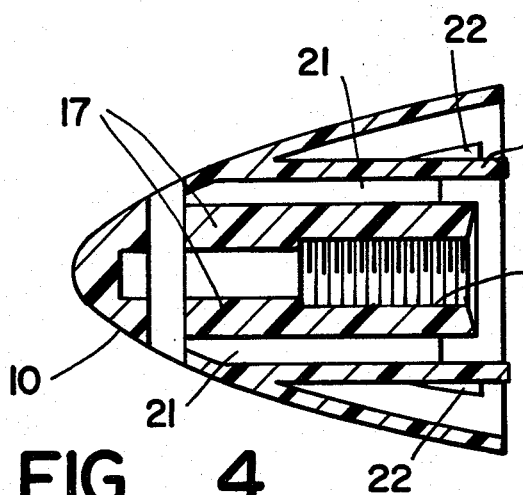
FIG_4
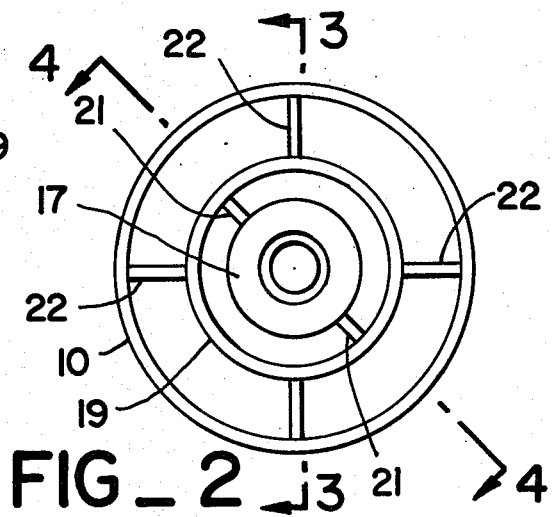
FIG_2

PROPELLER NUT

BACKGROUND OF THE INVENTION

The invention relates to retention of marine propellers, and more particularly to a self-locking propeller nut for retaining a propeller on a shaft and resisting the vibrational forces which ordinarily tend to unscrew a propeller nut.

Various apparatus have been used to retain a screw-on propeller nut on the end of a propeller shaft. Vibration has always been a problem, for it tends to loosen and unscrew almost anything associated with a propeller shaft. A typical scheme, used particularly on inboard-outboard drive systems, has been the provision of a splined area of the shaft, forward of the threaded end, which extends far enough back to extend rearwardly out of the propeller-bearing block. The non-rotational retention of the propeller block on the shaft has of course been the primary reason for the splined shaft. But the short rearward extension of this splined portion provided a mount for a flat annular plate with a correspondingly splined central bore. The outer periphery of this plate had a series of radially extending tabs, which, when the metal propeller nut was screwed in place adjacent to the plate, were bent over toward the nut to engage in a series of depressions in the nut's peripheral edge.

While this system was to some extent successful in preventing vibrational unscrewing of the propeller nut, it was costly in the number of components involved and the extra shaft length for the spline. Moreover, it was time consuming to crimp the multitude of metal tabs onto the propeller nut, and these of course had to be straightened out before the nut could be removed for propeller repair or maintenance. Metal fatigue would prevent the tabbed plate from lasting indefinitely. In service, some rattling could be expected from the strong vibrations acting among the nut, the plate, the shaft and the propeller block.

SUMMARY OF THE INVENTION

The present invention provides a novel propeller nut which avoids all the disadvantages of previous typical nut locking schemes. A self-locking nut according to the invention is of one molded piece, is inexpensive to manufacture, and grips the propeller shaft threads so tightly that no special exterior locking arrangement is required, despite strong and continuous vibration.

The propeller nut of the invention is shaped similar to prior propeller nuts at its exterior, being of a nose cone shape with a transverse hole near the tip for insertion of a bar or screwdriver to tighten the nut onto a propeller shaft. The nose cone shape is defined by an outer housing. Located centrally and axially within the nose cone shaped housing is an inner body with a central threaded bore adapted to be screwed onto the threaded end of a propeller shaft. The inner thread-bearing body may be cylindrically shaped, anchored at its back end to the propeller housing by integral molding. Preferably, the entire nut is of one piece, being molded of a non-rigid or semi-rigid, somewhat yieldable plastic material.

The threaded inner body is also connected to the housing by means of a web structure which both reduces the volume of material required for the nut and adds to the locking retention of the nut on the shaft. A plurality of fins extend radially outwardly from the threaded body to a larger generally cylindrical member, which in turn has similar fins or plate-like connecting members extending between its exterior and the interior wall of the housing. This is of course only one example of how the inner body may be connected to the housing, but it is preferred in that it is relatively simple, molded without difficulty, and is effective for strength and retention on the shaft.

The larger generally cylindrical member surrounding the threaded inner body is of a diameter which facilitates its engagement against the sleeve upon which the propeller is mounted, which usually comprises a rubber cushioned hub, when the nut is tightened. The threaded inner body, on the other hand, is recessed. When the nut is tighened with the outer cylinder bearing tightly against the propeller block, the webbing between the two cylinders yields springingly to a slight extent, exerting a great and continuing locking force on the nut and threaded shaft.

An important feature of the invention is that the threads of the nut's inner body are tapered toward a smaller diameter inside the nut, as in pipe threading, so that a greater and greater locking grip results between the nut and shaft as the nut is screwed on.

The tapered threads are preferably produced by use of a thread molding insert which is an otherwise normal cylindrical thread, but on which the thread ridges have been ground flatter and flatter, to smaller and smaller diameter, toward the inner end of the mold insert. This produces a female thread which has uniform diameter inner ridges, but troughs which taper from a normal diameter at the entrance to the propeller nut to a smaller diameter inside the nut.

Another important feature, adding still further to the self locking retention of the propeller nut, is that the threads are preferably spaced a slightly different distance apart than are the corresponding threads of the propeller shaft. The spacing is preferably closer, since this can easily be accomplished through natural shrinkage of the plastic material after molding. The spacing differential of course causes a greater resistance against rotation on the threads.

Accordingly, among the objects of the invention is to provide a propeller nut which is economically manufactured, is easily and quickly installed and removed, and which locks itself onto the propeller shaft sufficiently to resist the strong vibrations which ordinarily tend to loosen and unscrew a propeller nut. This and other objects of the invention will be apparent from the following description of a preferred embodiment, taken in conjunction with the accompanying drawings.

DESCRIPTION OF THE DRAWINGS

FIG. 1 is an exploded plan view of a propeller shaft and a rubber cushioned hub for positioning thereon for splined engagement therewith, and showing a self locking propeller nut according to the invention in position for assembly on the end of the shaft;

FIG. 2 is a front end view of the propeller nut;

FIG. 3 is a view of the nut assembled on the shaft, with the nut being shown in section along the line 3—3 of FIG. 2;

FIG. 4 is a sectional view of the nut taken along line 4—4 of FIG. 2;

FIG. 5 is an enlarged sectional view of a portion of FIG. 4, with the thread taper shown somewhat exaggerated and thread lines omitted for clarity.

DESCRIPTION OF THE PREFERRED EMBODIMENT

In the drawing, the exploded view of FIG. 1 shows a propeller nut 10 according to the invention, for screwing onto the threaded end 11 of a propeller shaft 12. The shaft has a splined section 13, and this is inserted through a correspondingly splined propeller mounting block 14 to cause the propeller to rotate with the shaft. The rearward end 13a of the spline area 13 may extend out beyond the propeller block 14 a short distance when the components are assembled (see FIG. 3). The reason for such extension was explained previously: i.e. many shaft-propeller assemblies have this feature to support a plate which was used in the prior art to engage the assembled nut and prevent its rotation. However, the spline extension 13 does not play a part in the locking features of the present invention.

FIG. 3 shows in phantom a portion of a propeller 15 which is assembled onto the mounting block 14.

FIGS. 2, 3, 4 and 5 show the internal structure of the nut 10. The entire nut is preferably integrally injection molded as one unit, from a nonrigid polymerized plastic material which will yield slightly to deformation, but will deform substantially elastically so as to exert continuing springing forces. For this purpose nylon has been found to be very satisfactory. Female threads 16 corresponding to the propeller shaft threads 11 are located centrally within an inner body 17 which is connected to an outer housing 18 of the nut at its rearward end.

The inner body 17 is also connected to the housing 18 by a webbing structure including a cylindrical member 19 concentrically surrounding it. The inner body is recessed from the cylinder 19 and from the forward end of the nut, as shown, and the member 19 may actually protrude slightly as indicated. Plate-like connecting members 21 (see FIGS. 2 and 4) extend between these inner and outer cylinders to adequately support the inner body and to provide for force-exerting deformation as discussed above. Two such members 21 have been found adequate, but more may be provided, if desired. The cylindrical member 19 is in turn connected to the housing by similar plate-like connecting members 22, four being shown in FIG. 2. The cylinder 19 bears against the propeller mounting block 14, as shown in FIG. 3. This webbing structure reduces the amount of material needed to mold the nut 10, while providing adequate strength and aiding in nut retention as explained above.

As indicated somewhat exaggeratedly in FIG. 4, the nut threads 16 are preferably tapered from a larger diameter at the open front end of the nut 10 to a smaller diameter inside the nut. This provides for tight gripping of the shaft threads by the nut. Also adding to the thread grip and resistance to vibrational rotation is the molding of the threads so that they are spaced apart a slightly different distance from that of the shaft threads 11. This distance may be either greater or smaller, but is preferably smaller. It can thus be accomplished by the natural shrinking of the plastic material following molding and removal of an unscrewing-type mold insert.

FIG. 5 shows the nut threads 16 in greater detail, illustrating one preferred manner in which they may be tapered. As indicated in this somewhat exaggerated representation, the inner ridges 24 of the threads are of substantially uniform diameter, but the troughs 25 become shallower and shallower, and consequently of smaller and smaller diameter, as the threads progress into the nut. This causes the propeller shaft threads 11 to dig into the plastic nut structure after the nut is screwed on a few revolutions, and it digs more and more deeply into the plastic as the nut is run down and tightened. After the nut is removed and replaced several times, it still exhibits substantially the same thread gripping action, due to the nature of the plastic material.

The threads 16 illustrated in FIG. 5 are produced through use of a threaded mold insert rod shaped complementarily to the nut threads shown in the figure. The mold insert (not shown) may have an otherwise normal cylindrical thread, but with its thread ridges ground flatter and flatter, to smaller and smaller diameter, toward its inner end. The insert is unscrewed when the plastic has set up.

The above described preferred embodiment provides a self locking propeller nut which avoids the need for exterior mechanical retaining devices, which utilizes a combination of features to positively lock the nut in place against rotation by means of frictional gripping forces, and which is economically manufactured and easily installed and removed. Various other embodiments and variations to this preferred embodiment will be apparent to those skilled in the art and may be made without departing from the spirit and scope of the invention as defined by the following claims.

I claim:

1. A one-piece self locking propeller nut for retention of a marine propeller on a threaded propeller shaft, comprising:

an outer housing having a front end and a back end;

an inner body within the outer housing, including a central threaded bore adapted to be screwed onto the threaded end of a propeller shaft, said threaded bore having threads which taper from a larger diameter near the front end of the housing to a smaller diameter inside the housing;

the inner body and the housing being integrally connected at the back end of the inner body, said inner body being generally cylindrical with its axis as the central axis of the nut, and being recessed from the front end of the nut, and web means integrally connecting the outside of the inner body with the inside of the housing, said web means including means spaced radially outwardly from the inner body for bearing against the back face of a sleeve member positioned on the shaft and associated with the propeller, whereby, when the propeller nut is screwed tightly onto the shaft, the bearing means of the propeller nut pushes against the back face of said sleeve member associated with the propeller, and the threaded inner body exerts an axial pulling force on the propeller shaft threads, with said web means between the inner body and the bearing means springingly deformed to a slight extent, so that said pulling force is maintained continuously on the threads, adding further friction on the threads and helping retain the nut on the shaft; and said one-piece nut being of a non-rigid, yieldable plastic material;

whereby said threads retain the nut tightly on the shaft, resisting vibrational forces which tend to loosen a propeller nut.

2. The self locking propeller nut of claim 1 wherein said bearing means comprises a generally cylindrical member surrounding and concentric with said inner body, with a back end integrally connected with the housing, said web means including radially disposed connecting members between the inner body and the generally cylindrical member.

* * * * *